Patented June 26, 1928.

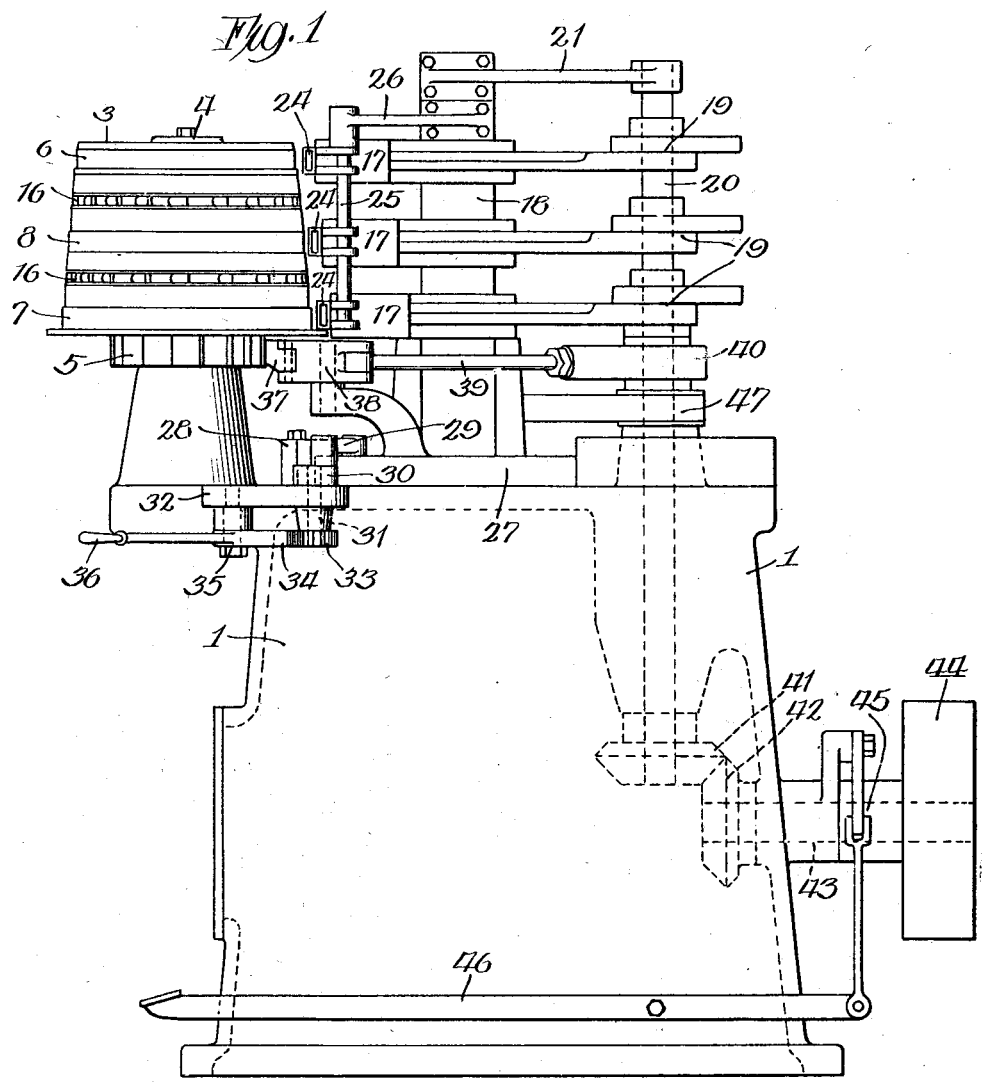

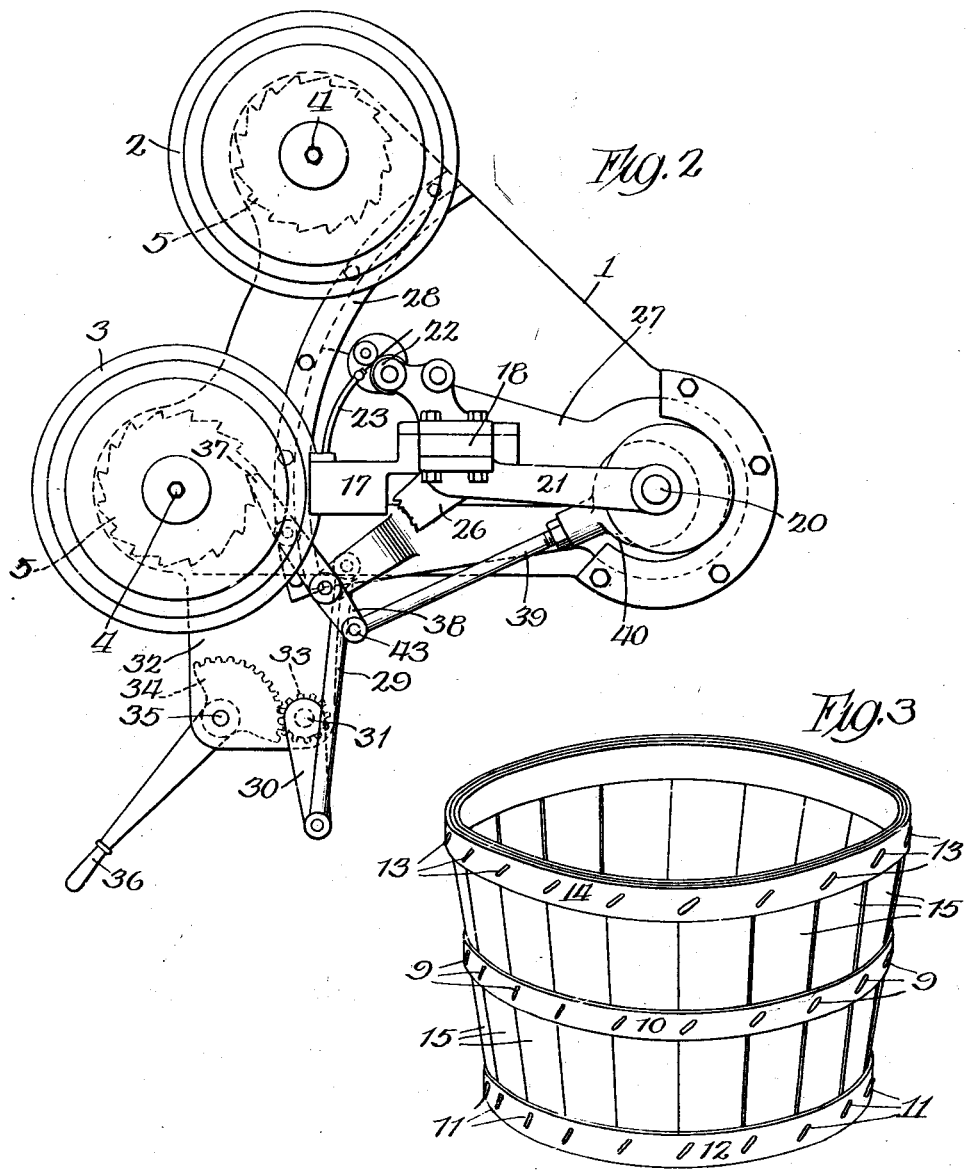

1,675,094

UNITED STATES PATENT OFFICE.

EDWARD CRAIG, OF ST. JOSEPH, MICHIGAN, ASSIGNOR TO SARANAC AUTOMATIC MACHINE CORPORATION, OF BENTON HARBOR, MICHIGAN, A CORPORATION OF DELAWARE.

MACHINE FOR MAKING BASKETS.

Application filed March 26, 1924. Serial No. 701,911.

This application is subordinate to and covers an improvement upon the structure shown, described and claimed in the copending application Serial No. 699,233, filed on the 14th day of March, 1924.

This invention relates to machinery for making baskets, more particularly to machines for making bushel baskets, or half-bushel baskets, or other baskets of similar shape, having both ends thereof left open, the basket being frusto-conical in form, whereby the smaller end of the basket is open, as well as the larger end, before the basket is filled, and whereby two closures are necessary for the open top and bottom of the basket.

Generally stated, the object of the invention is to provide an improved and simple and highly efficient arrangement whereby one basket form may be loaded while another basket form is rotating in front of the stapling mechanism, so that one basket is being made on one form while another basket is being assembled on the other form, and whereby the basket forms and the stapling mechanism have back and forth relative lateral movement, first in one direction and then in the opposite direction, in order to substitute the freshly loaded form for the other form from which the finished basket has been removed.

Another object is to provide an improved construction and arrangement of this character whereby said relative movement is obtained by positively shifting the stapling mechanism from one form to the other, so that the basket forms have stationary positions, each form being adapted to rotate in front of the stapling mechanism, of course, when said mechanism is shifted into operative relation with either form.

It is also an object to provide certain details and features of construction and combinations tending to increase the general efficiency and the desirability of a basket making machine of this particular character.

To the foregoing and other useful ends, the invention consists in the matters hereinafter set forth and claimed, and shown in the accompanying drawings, in which,—

Fig. 1 is a side elevation of a basket making machine embodying the principles of the invention.

Fig. 2 is a plan of said machine.

Fig. 3 is a perspective of one of the baskets made by said machine.

As thus illustrated, the invention comprises a suitable body 1 upon which the various operating parts are mounted in a suitable position thereon. The top of said body has the two basket forms 2 and 3 mounted thereon, each adapted to rotate about its vertical axis 4, and each form being provided at its bottom with a ratchet wheel 5, as shown. These basket forms taper upwardly, it will be seen, and are therefore frusto-conical in form. Each basket form has a top ring 6 and a bottom ring 7, against which the inner hoops of the basket are placed before the form is loaded. There is also a center ring 8 which serves as a means for clinching the middle rows of staples 9 of the basket, which staples are inserted through the middle hoop 10 which encircles the basket. The staples 11 are inserted through the outer hoop 12 of the basket, and then through the inner hoop of the basket and against the ring 6, so that these staples are properly clinched. The staples 13 are inserted at regular intervals through the outer hoop 14 at the larger end of the basket, and through the staves 15, as are the other staples, and then through the inner hoop and against the ring 7, whereby these staples are also clinched. The said staves 15 are assembled by inserting them under the clips or holders 16, arranged in two circular rows on each form, of any suitable character, so that one vertical edge of each stave is securely held in place when the staves are all assembled loosely on the form. Of course, the two inner hoops are first placed on the form, and then the staves are placed in position, so that the loaded form is then ready to be brought into operative relation to the stapling mechanism.

The said stapling mechanism comprises the three staplers 17 arranged, as shown, opposite the rings 6, 7 and 8, these staplers being of any suitable known or approved character, and the stationary heads or housings of the staplers being mounted on the vertical bracket arm 18, which is suitably supported by the body of the machine. The three staplers are arranged at different distances from the axis of the basket form, as shown, so that the staplers will be a uniform distance from their respective rings on the basket form. The different staplers are operated by cam or eccentric devices 19 on the vertical shaft 20, which latter extends downwardly through bearings in the body 1 previously mentioned. Rotation of this shaft will actuate all three staplers simultaneously, so that the three circular rows of staples will be formed simultaneously in the basket. The bracket 18 is connected by a bracket arm 21 with the top of the shaft 20, so that the latter has a bearing at its upper end.

Wire feeding devices 22 can be supported upon the vertical bracket arm 18, in operative relation to the different staplers, so a staple wire will be fed to the guide tubes 23 leading to their respective staplers. It is obvious that these wire feed devices can be operated in any suitable or desired manner.

These wire feed devices, of course, are disposed one above another, so that the tubes 23 are disposed one above another, in operative relation to their respective staplers, which latter are also arranged one above another and operated horizontally and at right angles to the axes of the basket forms as well as at right angles to the axis about which the stapling mechanism is movable from one basket form to another. Thus, the shaft 20 not only serves as the means by which the staplers are actuated, but also forms the axis about which the stapling mechanism is movable from one form to another, in the manner explained.

Furthermore, it will be seen that the hoops 10, 12 and 14 are preferably formed from strips which are fed to the basket, while it is rotating in front of the stapling mechanism, and for the purpose of feeding these hoop strips, guides 24 are preferably provided and mounted upon the vertically disposed member 25, which latter has its upper end secured to the bracket 26 secured to the vertical bracket arm 18 previously mentioned. These guides, it will be seen, are opposite the rings 6, 7 and 8, so that the hoop strips are fed in proper position to receive the staples from the three staplers, in such a manner that each strip is gradually bent around the basket and secured in place thereon.

The said stapling mechanism must be shifted from one basket form to the other and back again, in order to co-operate with each basket form. For this purpose, therefore, the vertically disposed support or bracket arm 18 is preferably mounted upon a swinging member 27, which is supported by the body 1 and which swings about the shaft 20 as an axis. The outer end portion of this member 27 swings in a curved guide 28 of any suitable character, which guide is also supported by the body of the machine. Thus, when this member 27 is swung from one side to the other, it carries the entire stapling mechanism with it, and for the purpose of accomplishing this shifting movement, the member 27 is connected by a link 29 with a crank arm 30 mounted to swing about a pivotal point 31 on the laterally extending bracket arm 32 of the body of the machine. The pinion 33 is rigid with the arm 30, and rotates about the axis point 31, and is engaged by an oscillatory gear segment 34 supported at a pivotal point 35 on the bracket 32 previously mentioned. A handle 36 is rigid with the gear segment 34, whereby the latter may be oscillated to turn the pinion 33 first in one direction and then in the other, thereby to shift the member 27 from one position to the other. This will carry the stapling mechanism from one basket form to the other, of course, so that the stapling mechanism can be caused to co-operate with either basket form.

For the rotation of each form in front of the stapling mechanism, a ratchet pawl 37 is provided on the end of the pivoted arm 38, the latter being connected by a pitman rod 39 with an eccentric device 40 on the shaft 20 previously mentioned. The arm 38 is so supported that the reciprocation of the pitman 39 causes the pawl 37 to actuate the ratchet wheel 5 previously mentioned, of either form, thus intermittently rotating either basket form in front of the stapling mechanism. It will be understood, of course, that this ratchet feed mechanism for the basket forms is so timed in its operation that the basket form is stationary while three staples are being inserted therein by the three staplers, and is then rotated a step before the next staples are driven, whereby the driving of staples alternates with the feeding motion of the ratchet mechanism by which the forms are rotated.

The lower end of the shaft 20 is provided with a bevel pinion or gear 41 which engages the other bevel gear or pinion 42 on the horizontally disposed shaft 43 mounted in suitable bearings on the body frame. This horizontal shaft 43 has a driving pulley 44, and power from the pulley to the shaft is controlled through the medium of a suitable clutch 45, of any known or approved form, controlled by a foot lever 46, whereby the rotation of the shaft 20 can be started and stopped at will.

Also, if desired, a band brake 47, of any suitable character, can be applied to the shaft 20, thereby to prevent over rotation of this shaft, and to permit the rotation of the shaft to be stopped promptly as soon as the basket is finished.

As thus illustrated, therefore, the basket forms and stapling mechanism have relative lateral movement, in a back and forth manner, notwithstanding that the basket forms are mounted in stationary position, for, in effect, first one basket form and then the other is brought into operative relation to the stapling mechanism. This relative movement is preferably obtained by positively moving or shifting the stapling mechanism itself, from one basket form to the other and back again, whereby one basket form can be loaded while the other basket form is cooperating with the stapling mechanism to staple the materials thereon. As soon as a basket is finished the rotation of the shaft 20 is stopped, by opening the clutch 45, and the attendant will then shift the stapling mechanism into operative relation with the other form, upon which latter materials have been assembled for another basket. The finished basket which has just been stapled can then be easily removed, by lifting it upwardly from the basket form, the stapling mechanism having been swung for enough away, of course, to permit this to be easily and conveniently done. Thus the relative lateral movement between the basket form and the stapling mechanism not only permits another basket form to be brought into operative relation to the stapling mechanism, but also permits a sufficiently wide separation of the basket form and the stapling mechanism to facilitate the direct upward removal of the finished basket from the form upon which it was stapled. With the stapling mechanism in operative relation to the basket form, and because of the arrangement of the staplers in the manner shown and described, some inconvenience and difficulty might be experienced in lifting the finished basket upwardly from the basket form, but any such difficulty is obviated entirely by the lateral movement as between the basket form and the stapling mechanism, as by such movement the stapling mechanism is moved far enough away to permit free and easy removal, in a direct upward manner, of the finished basket from the form upon which it was stapled.

With the construction shown and described, it will be seen that the forms 2 and 3 can be mounted upon a vertical axis in a manner involving some friction, so that the ratchet pawl device 37 will not over-feed, so to speak, while either form is being intermittently rotated, whereby each form will be fed or partially rotated exactly the length of a tooth on the ratchet wheel 5, each time the pawl is actuated after staples are driven. It will also be seen, of course, that the two operating positions of the stapling mechanism can be predetermined in any suitable or desired manner, and that as shown, for example, the length of the bracket arm 30 is such that when swung back and forth between two diametrically opposite positions or points, the stapling mechanism will be swung from its operative position in relation to one form to its operative position in relation to the other form. There will be sufficient friction, of course, as between the member 27 and the parts upon which it swings or slides, to hold it in either position, so that the stapling mechanism will not be liable to be jarred out of its operative position while co-operating with either form. Each basket form, therefore, has two operative positions, first, its position in operative relation to the stapling mechanism, and, second, its loading position. There are no other operative positions for either form, relatively to the stapling mechanism, and with the construction shown and described the loading position of each form is exactly the same as its stapling position, in view of the fact that the relative movement between the forms and the stapling mechanism is produced by positive movement of the mechanism itself. Therefore, as shown and described, the stapling mechanism has two operative positions, or a plurality of operative positions, and each operative position is opposite a different basket form. Two basket forms are shown and described, but it will be understood that any suitable or desired number of basket forms can be employed without departing from the spirit of the invention.

Thus the relative movement between the basket forms and the stapling mechanism is on a curved line struck from the center or axis at one side of the machine, the stapling mechanism being disposed between said axis and the curved line or circle upon which the axes of the basket forms are located and which is struck from the same axis. In other words, it will be observed that the vertical axes 4 of the basket forms are necessarily located on a circle struck from the axis represented by the shaft 20, and in view of the swinging movement of the stapling mechanism, to produce the relative movement between the basket forms and the stapling mechanism, it follows that such relative movement is on a curved line instead of being on a straight line. The pawl 37 is easily transferred from engagement with one ratchet wheel 5 to the other, for this pawl is pivoted on the arm 38, as explained, and is spring pressed, so that it can swing in either direction relatively to the arm 38, but by reason of the spring pressure (such as a spring, not shown, in the pivot joint of the pawl), said pawl is yieldingly pressed against the ratchet wheel. When the arm or lever 38 is vibrated about its axis, being pivoted on some suitable stationary portion of the machine, as shown, it will cause the pawl 37 to move backward to engage another tooth, when the rod 39 is pulled toward the shaft 20, in a manner that will be readily understood. On the other hand, when the rod 39 is pushed away from the shaft 20, by the eccentric device 40, then the toggle joint between the arm 38 and the pawl 37 is straightened out, causing the pawl to extend itself endwise to push the ratchet wheel 5 around a distance, thus giving the basket form a partial rotation. This automatic actuation of the basket forms, by ratchet mechanism in the manner stated, is not interfered with by the relative movement on a curved line between the basket forms and the stapling mechanism. Moreover, of course, the shifting of the stapling mechanism does not interfere with the proper conversion of the wire into staples, and the driving of these staples, in the required manner, such staples being made in the usual manner from the wire fed by the devices 22 previously mentioned. In other words, the basket forms are not far enough apart to render the cam devices or eccentric devices 19 inoperative to properly actuate the stapling mechanism, when the stapling mechanism is shifted from one basket form to the other, and the actuating mechanism is so constructed, of course, that the three staplers are actuated simultaneously in properly timed relation to the step by step feeding movement of either basket form, so that the stapling operation is the same in each case, regardless of which basket form is cooperating with the stapling mechanism.

What I claim as my invention is:

1. In a machine for making receptacles, the combination of a form, fastener driving mechanism adapted to co-operate with said form to insert fasteners in the materials placed upon said form, instrumentalities whereby said fastener driving mechanism is operated horizontally and said form is intermittently rotated about a vertical axis to receive the fasteners, devices whereby back and forth relative movement between said form and said mechanism about a vertical axis is produced, causing said mechanism and said form to alternately assume an operative and an inoperative relation to each other, with said mechanism between said last mentioned axis and said form, and means operative about said last mentioned axis to actuate said mechanism.

2. A structure as specified in claim 1, said form and mechanism being mounted to swing relatively about said last mentioned vertically disposed axis, whereby said relative movement is caused by relative swinging movement of said fastener driving mechanism between said form and said last mentioned axis.

3. A structure as specified in claim 1, said form and mechanism being mounted to swing relatively about said last mentioned vertically disposed axis, whereby said relative movement is accomplished by relative back and forth movement of said fastener driving mechanism between said form and said last mentioned axis, including a support whereby the axis of said form is stationary during such relative movement.

4. A structure as specified in claim 1, said instrumentalities including rotary means forming said axis of swinging motion for said mechanism, which axis is parallel with the axis of said form.

5. A structure as specified in claim 1, said mechanism comprising a plurality of staplers arranged one above another, together with feed devices arranged one above another for feeding wire to said staplers, and means to permit horizontal lateral movement of said mechanism.

6. A structure as specified in claim 1, said mechanism comprising staplers disposed one above another and adapted to swing about said last mentioned vertical axis to produce said relative movement, means for guiding hoop strips one above another between the staplers and the basket materials on the form, and means for feeding wire to the staplers.

7. In a basket making machine, the combination of a plurality of rotary basket forms mounted upon stationary axes disposed on the line of a circle, stapling mechanism arranged to swing from one form to the other, and vice versa, about an axis coincident with the axis of said circle and parallel with the axes of the forms, whereby to co-operate with either form, said mechanism being disposed between said axis of swinging movement and said forms, a ratchet wheel for each form, a ratchet pawl device operated automatically in the operation of the stapling mechanism to actuate the ratchet wheel of either form, depending upon which form is in operative relation to said stapling mechanism, and devices for shifting said stapling mechanism and ratchet pawl device from either form to the other, whereby either form may be loaded while the other form is co-operating with said stapling mechanism.

8. A structure as specified in claim 7, in combination with guides common to both forms for guiding hoop strips between the stapling mechanism and the materials on either form, disposed so that the strips are fed between the form in operation and the axis of said mechanism, whereby these strips may be bent around and stapled to the basket being made on either form.

9. A structure as specified in claim 7, in combination with feed devices carried by said swinging stapling mechanism, thereby movable about said axis of said circle, to feed wire for the staples.

10. A structure as specified in claim 7, comprising a vertically disposed shaft forming the axis of swinging movement of said stapling mechanism, with means on said shaft for actuating said stapling mechanism horizontally, and means on said shaft for actuating said ratchet pawl device common to both forms.

11. A structure as set forth in claim 7, comprising a horizontally swinging member upon which said stapling mechanism is mounted, a vertically disposed shaft forming the axis of swinging movement of said member, means on said shaft for actuating said stapling mechanism horizontally, and guiding means for said swinging member, said devices for swinging the stapling mechanism from one form to the other comprising gearing having link connection with said swinging member, and a handle for operating said gearing.

12. In a stapling machine, the combination of stapling mechanism, a shaft, eccentric means on said shaft to actuate said mechanism, means whereby said shaft forms an axis about which said mechanism is relatively movable, said shaft being vertically disposed, and supporting means whereby said mechanism is mounted for horizontal lateral movement and disposed in position to operate horizontally.

13. In a stapling machine, the combination of stapling mechanism, a shaft, eccentric means on said shaft to actuate said mechanism, means whereby said shaft forms an axis about which said mechanism is relatively movable, and a hoop guide for said mechanism movable therewith relatively about said axis.

14. In a stapling machine, the combination of stapling mechanism, a shaft, eccentric means on said shaft to actuate said mechanism, means whereby said shaft forms an axis about which said mechanism is relatively movable, a rotary basket form, a ratchet for rotating said basket form, and eccentric means on said shaft to actuate said ratchet.

15. In a stapling machine, the combination of stapling mechanism, a shaft, eccentric means on said shaft to actuate said mechanism, means whereby said shaft forms an axis about which said mechanism is relatively movable, and wire feed devices movable about said axis.

16. In a stapling machine, the combination of stapling mechanism, a shaft, eccentric means on said shaft to actuate said mechanism, means whereby said shaft forms an axis about which said mechanism is relatively movable, rotary basket forms, the axes of said forms extending parallel with said shaft, a ratchet wheel for each form, a ratchet pawl carried by and movable with the stapling mechanism, whereby said mechanism and pawl are movable into operative relation with either basket form, and eccentric means on said shaft to operate said ratchet pawl.

17. In a machine for making baskets, a plurality of basket forms rotatable about vertically disposed axes and mounted a fixed distance apart, a stapling mechanism for operation alternately with said forms, disposed horizontally, means for causing relative back and forth movement between said forms and mechanism, whereby said mechanism may operate with either form while the other form is being loaded, a vertically disposed rotary shaft, means on said shaft to actuate said mechanism, and means to rotate said shaft, said mechanism being disposed between said shaft and said forms.

18. A structure as specified in claim 17, said mechanism being mounted to swing from one form to the other about said shaft as an axis.

19. A structure as specified in claim 17, a ratchet pawl common to both forms, movable from one form to the other, a ratchet wheel associated with each form to engage said pawl, and means on said shaft to actuate said pawl.

EDWARD CRAIG.